United States Patent
Kamiya et al.

(10) Patent No.: US 7,927,533 B2
(45) Date of Patent: *Apr. 19, 2011

(54) METHOD FOR MANUFACTURING IMAGE DISPLAY DEVICE

(75) Inventors: Kenji Kamiya, Tochigi (JP); Yoshihisa Shinya, Tochigi (JP); Yusuke Kamata, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/450,192

(22) PCT Filed: Apr. 4, 2008

(86) PCT No.: PCT/JP2008/056818
§ 371 (c)(1),
(2), (4) Date: Sep. 15, 2009

(87) PCT Pub. No.: WO2008/123611
PCT Pub. Date: Oct. 16, 2008

(65) Prior Publication Data
US 2010/0043965 A1    Feb. 25, 2010

(30) Foreign Application Priority Data

Apr. 4, 2007 (JP) ................. 2007-098907
Jan. 11, 2008 (JP) ................. 2008-005027
Jan. 13, 2008 (JP) ................. 2008-005097

(51) Int. Cl.
*B29C 65/00* (2006.01)
(52) U.S. Cl. ......... 264/241; 264/494; 264/405; 264/1.7; 156/275.5
(58) Field of Classification Search ........... 264/494, 264/405, 241, 1.7; 156/275.5
See application file for complete search history.

(56) References Cited

U.S. PATENT DOCUMENTS 6,204,896 B1    3/2001    Matsuhira et al.
(Continued)

FOREIGN PATENT DOCUMENTS

EP    2 133 855 A1    12/2009
(Continued)

OTHER PUBLICATIONS

Mar. 19, 2010 Supplementary European Search Report for corresponding European Patent Application No. 08739924.2.
(Continued)

*Primary Examiner* — Christina Johnson
*Assistant Examiner* — Saeed M Huda
(74) *Attorney, Agent, or Firm* — Oliff & Berridge, PLC

(57) ABSTRACT

A thin image display device having a resin interposed between an image display unit and a protection member having a light-shielding member is manufactured. In the manufactured image display device, display defects caused by the deformation of the image display unit do not occur, and high-brightness and high-contrast display can be achieved. In addition, the resin in the area where the light-shielding member is formed can be sufficiently cured. The method for manufacturing an image display device includes the step of forming a cured resin layer by interposing a photo-curable resin composition between a base including the image display unit and a light-transmitting protection member including a light-shielding member and then photo-curing the photo-curable resin composition. In this method, a resin composition having a curing shrinkage ratio of 5% or less, yielding a cured product having a storage elastic modulus at 25° C. of $1.0 \times 10^7$ Pa or less, and forming the cured resin layer having a light transmittance of 90% or more in a visible range is used as the photo-curable resin composition. The photo-curable resin composition is photo-cured by irradiating it with rays of light at least from an outer side surface with respect to a forming surface of the light-shielding member.

9 Claims, 4 Drawing Sheets

U.S. PATENT DOCUMENTS

| | | |
|---|---|---|
| 6,654,083 B1 | 11/2003 | Toda et al. |
| 2002/0131141 A1 | 9/2002 | Saitoh |
| 2003/0006704 A1 | 1/2003 | Morimoto et al. |
| 2006/0159867 A1 | 7/2006 | O'Donnell |
| 2006/0272771 A1 | 12/2006 | Suzuki et al. |

FOREIGN PATENT DOCUMENTS

| | | |
|---|---|---|
| JP | A-60-79388 | 5/1985 |
| JP | A 6-299126 | 10/1994 |
| JP | A-8-160407 | 6/1996 |
| JP | A 9-274536 | 10/1997 |
| JP | A 10-293314 | 11/1998 |
| JP | A-2001-26758 | 1/2001 |
| JP | A 2002-40208 | 2/2002 |
| JP | A-2002-108238 | 4/2002 |
| JP | A 2002-323861 | 11/2002 |
| JP | A-2002-341317 | 11/2002 |
| JP | A-2002-341776 | 11/2002 |
| JP | A 2003-207790 | 7/2003 |
| JP | A-2004-61925 | 2/2004 |
| JP | A 2004-117545 | 4/2004 |
| JP | A-2004-224855 | 8/2004 |
| JP | A 2004-256595 | 9/2004 |
| JP | A 2005-23315 | 1/2005 |
| JP | A 2005-55641 | 3/2005 |
| JP | A 2005-179481 | 7/2005 |
| JP | A 2006-11212 | 1/2006 |
| JP | A-2006-150755 | 6/2006 |
| JP | A-2006-276105 | 10/2006 |
| JP | A-2006-292993 | 10/2006 |
| JP | A-2007-10769 | 1/2007 |
| WO | WO 2007/063751 A1 | 6/2007 |

OTHER PUBLICATIONS

International Search Report issued in PCT/JP2008/056601 mailed Jun. 10, 2008.
Extended European Search Report issued in European Patent Application No. 08739711.3 on Mar. 17, 2010.
International Search Report issued in PCT/JP2008/056996 mailed Jul. 1, 2008.
International Preliminary Report on Patentability issued in International Application No. PCT/JP2008/056996 on Jan. 21, 2010.
Extended European Search Report issued in European Patent Application No. 08740099.0 on Jun. 25, 2010.
Extended European Search Report issued in European Patent Application No. 08740171.7 on Jun. 7, 2010.

(a)

(b)

(c)

(a)

(b)

(c)

METHOD FOR MANUFACTURING IMAGE DISPLAY DEVICE

TECHNICAL FIELD

The present invention relates to a method for manufacturing an image display device such as a liquid crystal display (LCD) device used, for example, in a cellular phone, and in particular, to a method for manufacturing an image display device having a transparent protection member disposed on an image display unit.

BACKGROUND TECHNOLOGY

One conventional example of such an image display device is one shown in FIG. 4.

This liquid crystal display device 101 includes a transparent protection member 103 made of, for example, glass or plastic and disposed on a liquid crystal display panel 102.

In this device, to protect the surface of the liquid crystal display panel 102 and a polarizing plate (not shown), a spacer 104 is interposed between the liquid crystal display panel 102 and the protection member 103, so that a gap 105 is provided between the liquid crystal display panel 102 and the protection member 103.

However, the gap 105 present between the liquid crystal display panel 102 and the protection member 103 causes light scattering, and this results in a reduction in contrast and in brightness. The presence of the gap 105 is an obstacle to the reduction in thickness of the panel.

In view of the above problems, a technique has been proposed in which the gap between the liquid crystal display panel and the protection member is filled with a resin (for example, Patent Document 1). However, the stress during the cure shrinkage of the cured resin causes deformation of the optical glass plates sandwiching the liquid crystal of the liquid crystal display panel. This results in display defects such as irregularities in orientation of the liquid crystal material.

Moreover, to improve the brightness and contrast of displayed images, the liquid crystal display device 101 includes a black frame-like light-shielding member (so-called black matrix, not shown) that is formed on the protection member 103 so as to be situated corresponding to the peripheral portion of the liquid crystal display panel 102.

However, in such a structure, when the gap 105 between the liquid crystal display panel 102 and the protection member 103 is filled with a photo-curable resin composition and rays of light is irradiated to cure the resin composition, the resin composition present in an area where the light-shielding member is formed may not be cured. This is because a sufficient amount of light does not reach that area.

[Patent Document 1] Japanese Patent Application Laid-Open No. 2005-55641.

DISCLOSURE OF THE INVENTION

Problems to be Solved by the Invention

The present invention has been made in view of the problems in the conventional technologies. It is an object of the invention to provide a technique for manufacturing a thin image display device in which a resin is interposed between an image display unit and a protection member provided with a light-shielding member. This technique prevents display defects caused by the deformation of the image display unit, enables high-brightness and high-contrast image display, and allows the resin in an area where the light-shielding member is formed to be cured sufficiently.

Means for Solving the Problems

To achieve the above object, there is provided a method for manufacturing an image display device, the method comprising the step of forming a cured resin layer by interposing a photo-curable resin composition between a base including an image display unit and a light-transmitting protection member including a light-shielding member and then photo-curing the photo-curable resin composition, wherein
a resin composition having a curing shrinkage ratio of 5% or less, yielding a cured product having a storage elastic modulus at 25° C. of $1.0\times10^7$ Pa or less, and forming the cured resin layer having a light transmittance of 90% or more in a visible range is used as the photo-curable resin composition, and wherein
photo-curing is performed by irradiating the photo-curable resin composition with rays of light at least from an outer side surface with respect to a forming surface of the light-shielding member.

In the present invention, the image display unit may be a liquid crystal display panel.

In the present invention, the protection member may be made of an acrylic resin.

In the present invention, the protection member may be made of an optical glass.

Effects of the Invention

The internal stress accumulated during curing of the resin can be approximated by the product of the storage elastic modulus after curing and the curing shrinkage ratio. In the present invention, the curable resin composition used has a curing shrinkage ratio of 5% or less and yields a cured product having a storage elastic modulus at 25° C. of $1.0\times10^7$ Pa or less. The use of such a curable resin composition provides a suitable relationship between the elastic modulus and curing shrinkage ratio of the resin filling the gap between the image display unit and the protection member, and can minimize the influence of the stress during curing and shrinkage of the resin on the image display unit and the protection member. Therefore, almost no strain occurs in the image display unit and the protection member. Accordingly, a high-brightness and high-contrast image can be displayed without display defects.

In particular, when the image display unit is a liquid crystal display panel, display defects such as irregularities in orientation of the liquid crystal material can be reliably prevented, so that a high quality image can be displayed.

In the present invention, the cured resin is interposed between the image display unit and the protection member, and this provides high impact resistance.

Moreover, an image display device thinner than that in the conventional example in which a gap is formed between the image display unit and the protection member can be provided.

In addition, in the present invention, a photo-curable resin composition is used as the curable resin composition interposed between the image display unit and the protection member, and is irradiated with rays of light at least from an outer side surface with respect to a forming surface of the light-shielding member. Therefore, the photo-curable resin composition in the area where the light-shielding member is formed is properly irradiated with rays of light and cured sufficiently.

DESCRIPTION OF THE REFERENCE NUMERALS

Figure 1:
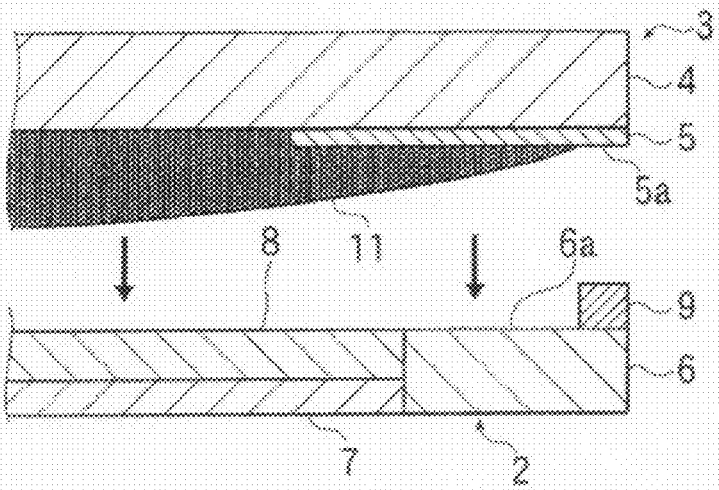
FIG. 1 is a series of cross-sectional process views illustrating the main part of a manufacturing method of an embodiment of the present invention.
Figure 1:
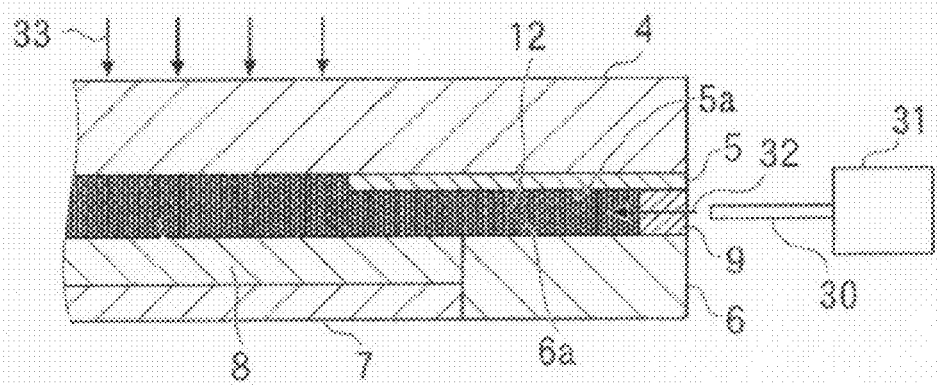
Figure 1:
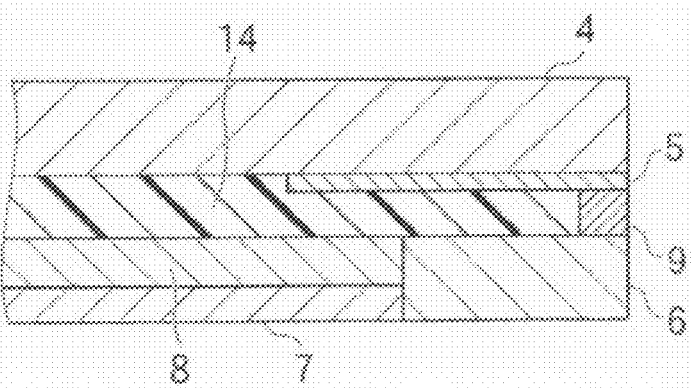

1 . . . image display device
2 . . . base
3 . . . protection member
4 . . . light-transmitting member
5 . . . light-shielding member
5a . . . bonding surface of light-shielding member
6 . . . frame
6a . . . bonding surface of frame
7 . . . backlight
8 . . . liquid crystal display panel (image display unit)
11 . . . photo-curable resin composition
12 . . . resin composition-filled portion
14 . . . cured resin layer
32, 33 . . . UV rays

BEST MODE FOR CARRYING OUT THE INVENTION

Hereinafter, preferred embodiments of the present invention will be described in detail with reference to the drawings. In the drawings, the same reference numerals denote the same or like elements.

FIGS. 1(a) to 1(c) are cross-sectional process views illustrating the main part of an embodiment of the method for manufacturing an image display device according to the present invention. FIG. 2 is a plan view illustrating the main part in the manufacturing process of the image display device in the embodiment.

Figure 2:
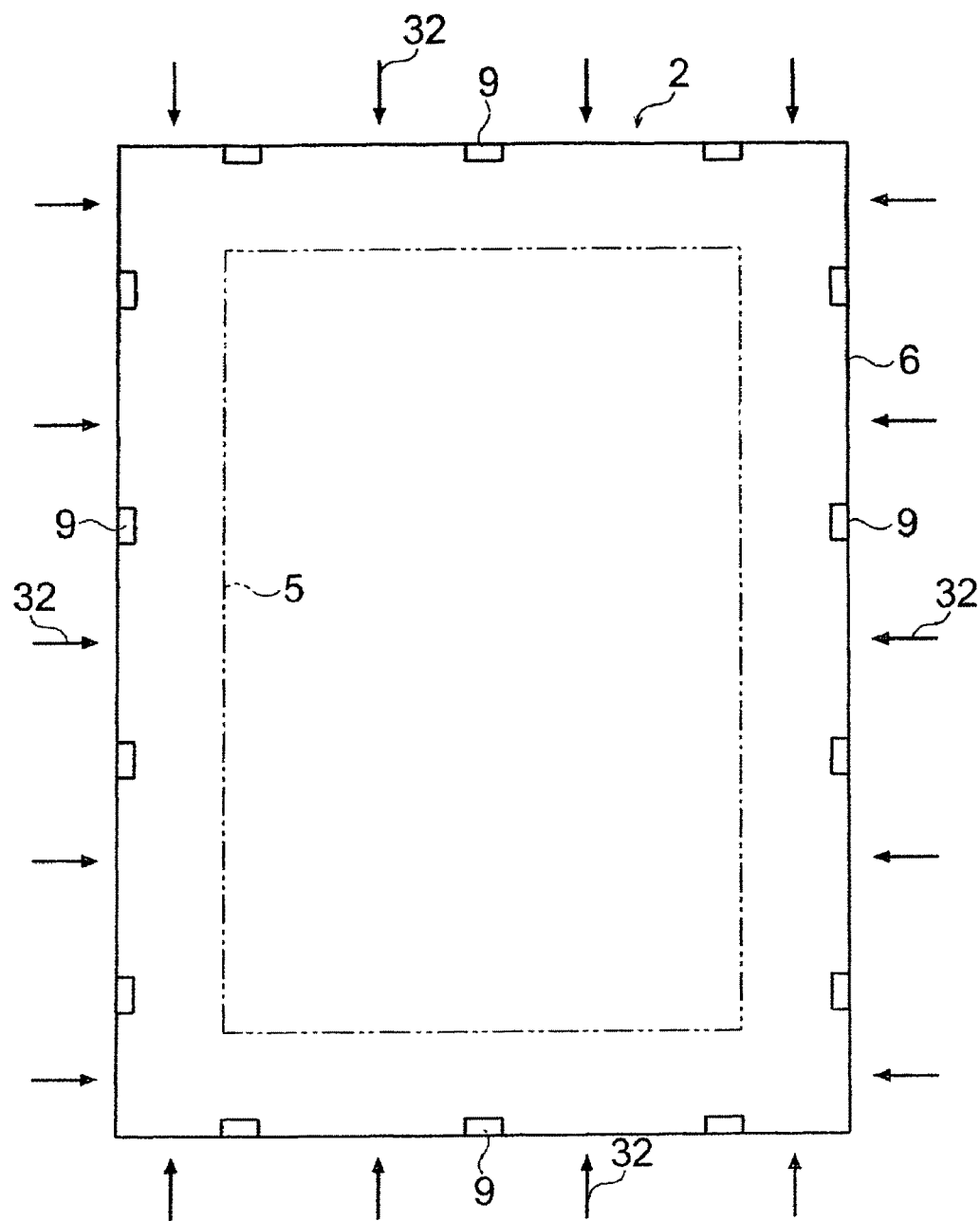
FIG. 2 is a plan view illustrating the main part of the manufacturing process of the embodiment.

In the present embodiment, as shown in FIG. 1, a base 2 including an image display unit is bonded to a protection member 3 with a cured resin layer 14 interposed therebetween. The image display unit is connected to a driving circuit (not shown) and displays a predetermined image.

No particular limitation is imposed on the image display device, and the image display device can be applied to various applications. Examples of the image display device include liquid crystal display devices for cellular phones, portable game consoles, and the like. Hereinafter, the present invention will be described by way of an example of manufacturing a liquid crystal display device.

The protection member 3 is formed of, for example, a rectangular flat light-transmitting member 4 having substantially the same size as the base 2. For example, optical glass or plastic (such as acrylic resin) can be suitably used as the light-transmitting member 4.

A light-shielding member 5 having, for example, a black frame-like shape is disposed on one side (base 2 side) of the light-transmitting member 4 so as to be positioned in a region corresponding to the periphery of a liquid crystal display panel. The light-shielding member 5 can be formed using, for example, a printing method.

The base 2 includes a frame 6 having, for example, a frame-like shape. The liquid crystal display panel (image display unit) 8 is attached to the inner region defined by the frame 6, and a backlight 7 is attached to the rear side of the liquid crystal display panel 8.

A plurality of spacers 9 are intermittently disposed at predetermined regular intervals on the peripheral portion on the liquid crystal display panel 8 side of the frame 6 of the base 2, as shown in FIG. 2. The thickness of the spacers 9 is about 0.05 to about 1.5 mm, so that the distance between the surfaces of the liquid crystal display panel 8 and the protection member 3 is maintained at about 1 mm.

In particular, in the present embodiment, the bonding surface 6a of the frame 6 of the base 2 is parallel to the bonding surface 5a of the light-shielding member 5 of the protection member 3.

In the above configuration of the present embodiment, first, a predetermined amount of a photo-curable resin composition 11 is applied dropwise to the protection member 3 on the light-shielding member 5 side, as shown in FIG. 1(a), and then the protection member 3 is turned upside down so that the protection member 3 and the image display unit 8 face each other. Next, the protection member 3 is placed on the spacers 9 of the base 2, whereby a resin composition-filled portion 12 is formed as shown in FIG. 1(b).

Preferably, the amount of the photo-curable resin composition 11 applied dropwise is adjusted such that a cured resin layer 14 obtained by curing the resin composition-filled portion 12 has a thickness of 50 to 200 μm.

The photo-curable resin composition 11 is prepared such that the cured product of the resin has a storage elastic modulus (25° C.) of $1 \times 10^7$ Pa or less and preferably $1 \times 10^3$ to $1 \times 10^6$ Pa and a refractive index of preferably 1.45 or more and 1.55 or less and more preferably 1.51 or more and 1.52 or less. In addition, the photo-curable resin composition 11 is prepared such that, when the thickness of the cured product of the resin is 100 μm, the transmittance in the visible range is 90% or more.

Generally, a curable resin composition containing the same main resin component as that of the photo-curable resin composition 11 may yield a cured product having a storage elastic modulus (25° C.) exceeding $1 \times 10^7$ Pa when different co-present resin, monomer, and other components are used. A resin composition yielding such a cured product is not used as the photo-curable resin composition 11.

Moreover, the photo-curable resin composition 11 is prepared such that the curing shrinkage ratio is preferably 5.0% or less, more preferably 4.5% or less, particularly preferably 4.0% or less, and most preferably 0 to 2%. In this manner, the internal stress accumulated in the cured resin when the photo-curable resin composition 11 is cured can be reduced, and the occurrence of strain at the interface between the cured resin layer 14 and the liquid crystal display panel 8 or the protection member 3 can be prevented. Therefore, when the photo-curable resin composition 11 is interposed between the liquid crystal display panel 8 and the protection member 3 and is cured, the cured product can reduce light scattering generated at the interface between the cured resin layer 14 and the liquid crystal display panel 8 or the protection member 3. This can increase the brightness of the displayed image and improve visibility.

The amount of internal stress accumulated in the cured product of a resin composition during curing can be evaluated by the average surface roughness of the cured resin obtained by applying dropwise the resin composition to a flat plate and curing the applied resin composition. For example, 2 mg of a resin composition is applied dropwise to a glass or acrylic plate and cured by irradiation with UV rays to a cure ratio of 90% or more. When the average surface roughness of the resultant cured resin is 6.0 nm or less, the interfacial strain caused by the cured product of the curable resin composition interposed between the liquid crystal display panel 8 and the protection member 3 is practically negligible. With the photo-curable resin composition 11 used in the present embodiment, the average surface roughness can be 6.0 nm or less, preferably 5.0 nm or less, and more preferably 1 to 3 nm. Therefore, the strain generated at the interfaces of the cured resin is practically negligible.

Any glass plate used for sandwiching the liquid crystal of a liquid crystal cell or used as the protection plate for a liquid crystal cell may be preferably used as the above glass plate. Any acrylic plate used as the protection plate for a liquid crystal cell may be preferably used as the above acrylic plate. The average surface roughness of such glass and acrylic plates is typically 1.0 nm or less.

Preferred examples of such a resin composition include resin compositions containing: at least one polymer such as polyurethane acrylate, polyisoprene acrylate, esterified products thereof, hydrogenated terpene resin, or butadiene polymer; at least one acrylate monomer such as isobornyl acrylate, dicyclopentenyloxyethyl methacrylate, or 2-hydroxybutyl methacrylate; and a photo polymerization initiator such as 1-hydroxy-cyclohexyl-phenyl-ketone.

The protection member 3 often has a UV cut function to protect the image display unit 8 from UV rays. Therefore, it is preferable to use, as the photo polymerization initiator, a photo polymerization initiator that can initiate curing in the visible range (for example, trade name: SpeedCure TPO, product of Nihon SiberHegner K.K.).

Next, as shown in FIG. 1(b), UV rays 33 are irradiated through the light-transmitting member 4. No particular limitation is imposed on the irradiation direction of the UV rays 33. Preferably, to uniformly cure the photo-curable resin composition 11 in the image display area, the irradiation direction of the UV rays 33 is perpendicular to the surface of the light-transmitting member 4.

In the present invention, in addition to the irradiation with the UV rays 33, UV rays 32 are directly irradiated to the photo-curable resin composition 11 in the area where the light-shielding member 5 is formed using a UV irradiation apparatus 31 including a small irradiation unit 30 composed of, for example, optical fibers. More specifically, the UV rays 32 are directly irradiated to the photo-curable resin composition 11 disposed between the light-shielding member 5 and the base 2 from the outer side surface with respect to the bonding surface 5a of the light-shielding member 5 (i.e., the forming surface of the light-shielding member) through the gaps between the spacers 9.

No particular limitation is imposed on the irradiation direction of the UV rays 32. The irradiation direction may be inclined to the horizontal direction by 0° or more and 90° or less. Preferably, to facilitate uniform curing of the photo-curable resin composition 11 in the area where the light-shielding member 5 is formed, the UV rays 32 are irradiated so as to be substantially parallel to the bonding surface 6a of the frame 6 of the base 2 and to the bonding surface 5a of the light-shielding member 5 of the protection member 3.

By irradiating with the UV rays in the manner described above, the resin composition-filled portion 12 is cured to form the cured resin layer 14 as shown in FIG. 1(c), whereby the target image display device 1 is obtained.

In the obtained image display device 1, the use of the particular photo-curable resin composition 11 can minimize the influence of the stress caused by the cure shrinkage of the resin on the image display unit 8 and the protection member 3. Therefore, almost no strain occurs in the image display unit 8 and the protection member 3, so that the image display unit 8 is not deformed. This allows high-brightness and high-contrast image display without display defects.

Moreover, the cured resin layer 14 formed by curing the photo-curable resin composition 11 allows to provide a shock-resistant image display device 1 that is thinner than that of the conventional example in which a gap is formed between the image display unit and the protection member.

In addition, since the photo-curable resin composition 11 disposed between the frame 6 of the base 2 and the light-shielding member 5 is irradiated with rays of light also from the outer side surface with respect to the bonding surface 5a of the light-shielding member 5, the photo-curable resin composition 11 in the area where the light-shielding member 5 is formed is properly irradiated with rays of light and cured sufficiently.

Figure 3:
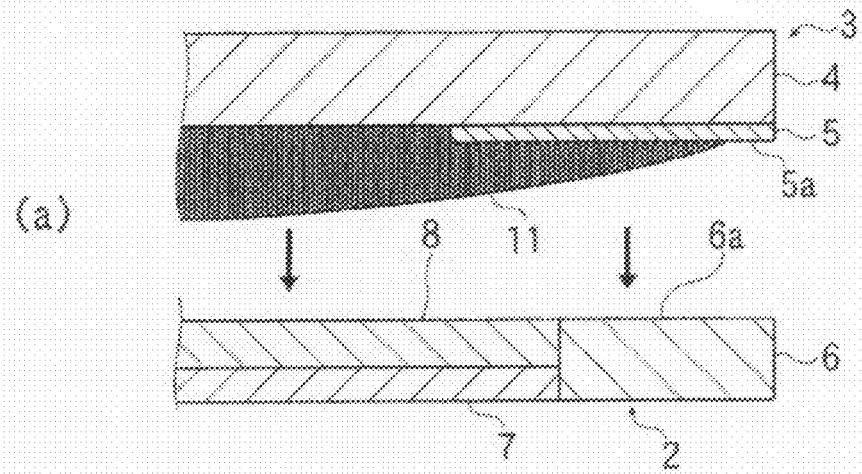
FIG. 3 is a series of cross-sectional process views illustrating the main part of a manufacturing method of another embodiment.
Figure 3:
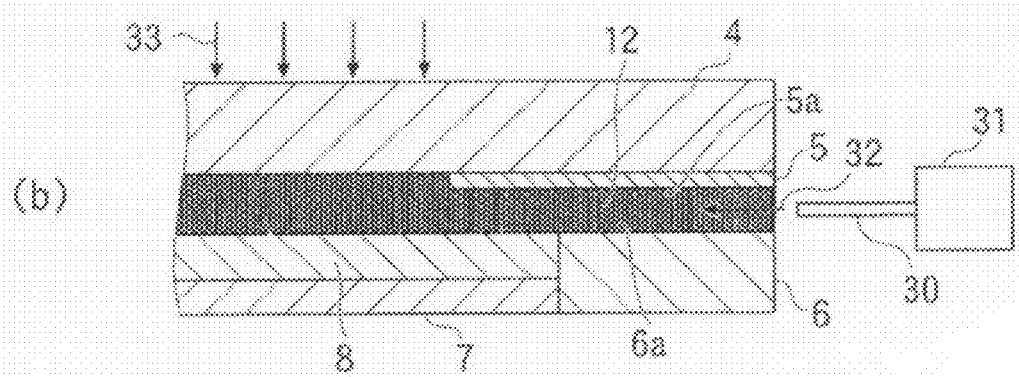
Figure 3:
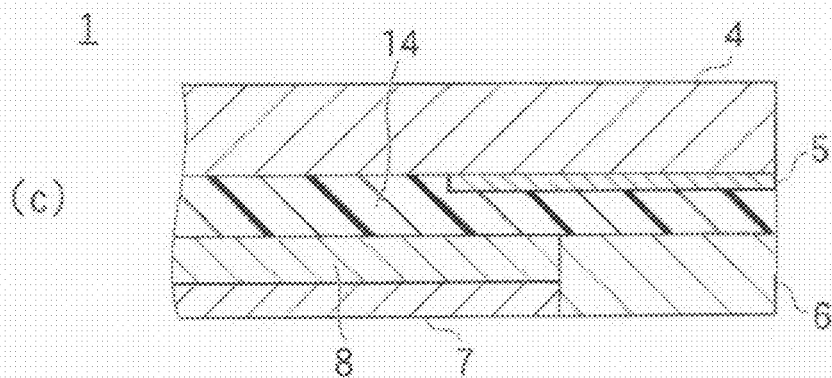
Figure 4:
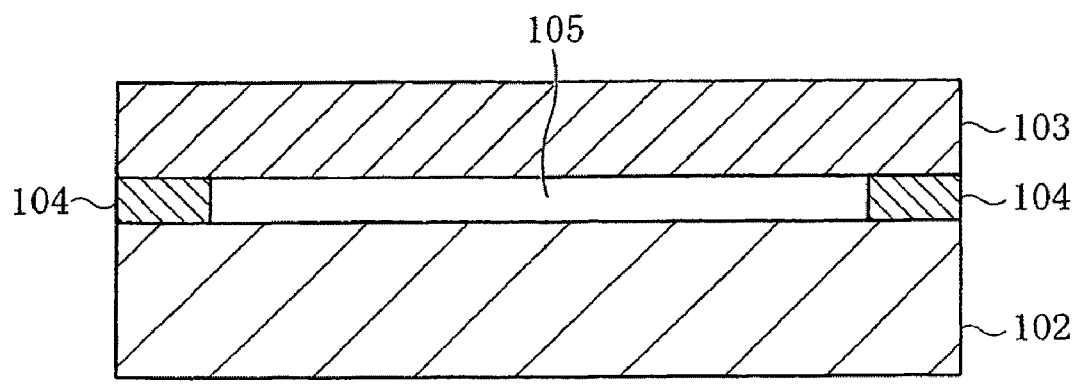
FIG. 4 is a cross-sectional view illustrating the main part of a conventional image display device.

The present invention can be embodied in other various forms. For example, an image display device 1 having no spacers 9 may be manufactured as shown in FIG. 3. In this case, the photo-curable resin composition 11 is applied to the base 2, and the protection member 3 is placed on the applied resin composition. The resin composition is photo-cured in the same manner as described above.

Moreover, the present invention is applicable not only to the liquid crystal display device described above but also to various panel displays such as organic EL and plasma display devices.

EXAMPLES

Hereinafter, the present invention will be specifically described by way of Examples and Comparative Examples, but the invention in not limited to the following Examples.

The following resin compositions of Examples 1 to 4 and Comparative Examples 1 to 3 were prepared.

Resin Composition of Example 1

50 Parts by weight of polyurethane acrylate (trade name: UV-3000B, product of Nippon Synthetic Chemical Industry Co., Ltd.), 30 parts by weight of isobornyl acrylate (trade name: IBXA, product of Osaka Organic Chemical Industry Ltd.), 3 parts by weight of a photo polymerization initiator (trade name: IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare the resin composition of Example 1.

Resin Composition of Example 2

70 Parts by weight of an esterified product of 2-hydroxyethyl methacrylate and a maleic anhydride adduct of polyisoprene polymer, 30 parts by weight of dicyclopentenyloxyethyl methacrylate, 10 parts by weight of 2-hydroxybutyl methacrylate, 30 parts by weight of hydrogenated terpene resin, 140 parts by weight of butadiene polymer, 4 parts by weight of a photo polymerization initiator, and 0.5 parts by weight of a photo polymerization initiator for visible light were kneaded using a kneader to prepare the resin composition of Example 2.

Resin Composition of Example 3

100 Parts by weight of an esterified product of 2-hydroxyethyl methacrylate and a maleic anhydride adduct of polyisoprene polymer, 30 parts by weight of dicyclopentenyloxyethyl methacrylate, 10 parts by weight of 2-hydroxybutyl methacrylate, 30 parts by weight of hydrogenated terpene resin, 210 parts by weight of butadiene polymer, 7 parts by weight of a photo polymerization initiator, and 1.5 parts by weight of a photo polymerization initiator for visible light were kneaded using a kneader to prepare the resin composition of Example 3.

Resin Composition of Example 4

70 Parts by weight of an esterified product of 2-hydroxyethyl methacrylate and a maleic anhydride adduct of polyisoprene polymer (trade name: UC-203, product of Kuraray Co., Ltd.), 30 parts by weight of dicyclopentenyloxyethyl methacrylate (trade name: FA512M, product of Hitachi Chemical Co., Ltd.), 10 parts by weight of 2-hydroxybutyl methacrylate (trade name: LIGHT-ESTER HOB, product of Kyoeisha Chemical Co., Ltd.), 30 parts by weight of hydrogenated terpene resin (trade name: Clearon P-85, product of Yasuhara Chemical Co., Ltd.), 35 parts by weight of butadiene polymer (trade name: Polyoil 110, product of Zeon corporation), 5 parts by weight of a photo polymerization initiator (trade name: IRGACURE 184D, product of Ciba Specialty Chemicals), and 2 parts by weight of a photo polymerization initiator (trade name: SpeedCure TPO, product of Nihon Siber-Hegner K.K.) were kneaded using a kneader to prepare the resin composition of Example 4.

Resin Composition of Comparative Example 1

50 Parts by weight of polybutadiene acrylate (trade name: TE-2000, product of Nippon Soda Co., LTD.), 20 parts by weight of hydroxyethyl methacrylate (trade name: LIGHT-ESTER HO, product of Kyoeisha Chemical Co., Ltd.), 3 parts by weight of a photo polymerization initiator (IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare the resin composition of Comparative Example 1.

Resin Composition of Comparative Example 2

50 Parts by weight of polyurethane acrylate (trade name: UV-3000B, product of Nippon Synthetic Chemical Industry Co., Ltd.), 30 parts by weight of tricyclodecane dimethanol acrylate (trade name: NK ESTER LC2, product of Shin-Nakamura Chemical Co., Ltd.), 3 parts by weight of a photo polymerization initiator (IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare the resin composition of Comparative Example 2.

Resin Composition of Comparative Example 3

50 Parts by weight of polybutadiene acrylate (trade name: TE-2000, product of Nippon Soda Co., Ltd.), 20 parts by weight of isobornyl acrylate (trade name: IBXA, product of Osaka Organic Chemical Industry Ltd.), 3 parts by weight of a photo polymerization initiator (IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare the resin composition of Comparative Example 3.

Experimental Example 1

The resin compositions of Examples 1 to 4 and the resin compositions of Comparative Examples 1 to 3 were applied dropwise to 100 μm-thick white glass plates so as to have a predetermined thickness. The glass plates were carried into a UV conveyer, whereby the cured products of the resins having a predetermined thickness were obtained and used as samples.

Each of the samples was measured for "light transmittance", "storage elastic modulus", "curing shrinkage ratio", and "surface roughness" as follows. The results are shown in Table 1.

[Light Transmittance]

The light transmittance (%) in the visible range was measured for each sample (the thickness of the cured resin: 100 μm) using an ultraviolet and visible spectrophotometer (V-560, product of JASCO Corporation) and was found to be 90% or more for all the samples.

[Storage Elastic Modulus]

The storage elastic modulus (Pa, 25° C.) was measured for each sample at a measurement frequency of 1 Hz using a viscoelasticity measuring apparatus (DMS 6100, product of Seiko Instruments Inc.).

[Curing Shrinkage Ratio]

The specific gravities of the uncured liquid resin and the cured solid were measured using an electronic densimeter (SD-120L, product of Alfa Mirage Co., Ltd.), and the curing shrinkage ratio (%) was computed from the difference between the specific gravities using the equation below.

Curing shrinkage ratio(%)=(specific gravity of cured product−specific gravity of liquid resin)/(specific gravity of cured product)×100.  [Equation 1]

[Surface Roughness]

Each resin composition (2 mg) was applied dropwise to a glass plate for a liquid crystal cell. Then, the strain (Ra: average surface roughness) in a predetermined area (2.93 mm×2.20 mm) on the glass plate surface caused by the internal stress during UV curing was measured using a three-dimensional non-contact surface roughness measuring apparatus (product of Zygo Corporation).

TABLE 1

Properties and evaluation results of Examples and Comparative Examples

| Resin Composition | Transmittance (%) | Storage elastic modulus (Pa) | Curing shrinkage ratio (%) | Ra: Average surface roughness (nm) |
|---|---|---|---|---|
| Example 1 | 90 or more | $1 \times 10^6$ | 4.5 | 5.5 |
| Example 2 | 90 or more | $1 \times 10^4$ | 1.8 | 2.7 |
| Example 3 | 90 or more | $4 \times 10^3$ | 1.0 | 1.5 |
| Example 4 | 90 or more | $4 \times 10^5$ | 3.8 | 5.0 |
| Comparative Example 1 | 90 or more | $2 \times 10^7$ | 5.6 | 12.4 |
| Comparative Example 2 | 90 or more | $3 \times 10^8$ | 4.3 | 36.5 |
| Comparative Example 3 | 90 or more | $5 \times 10^8$ | 5.6 | 64.2 |

As is clear from Table 1, for the resin compositions of Examples 1 to 4, the results were satisfactory. More specifically, the storage elastic modulus was $4 \times 10^3$ to $1 \times 10^6$ Pa, and the curing shrinkage ratio was 1.0 to 4.5%. Therefore, the average surface roughness Ra was 1.5 to 5.5 nm, and almost no strain occurred. However, for each of the resin composition of Comparative Example 1 (Ra=12.4 nm), the resin composition of Comparative Example 2 (Ra=36.5 nm), and the resin composition of Comparative Example 3 (Ra=64.2 nm), Ra was large. This indicates that the interface between the resin and the glass plate was deformed due to the internal stress during curing of the resin.

Experimental Example 2

Measurement of Cure Ratio

About 0.2 g of the resin composition of Example 1 prepared in Experimental Example 1 was applied dropwise to an acrylic plate to be used as the protection member 3 in FIG. 1(*a*). The acrylic plate was disposed on a liquid crystal display panel to be used as the base 2 so as to face each other, whereby the gap between the liquid crystal panel and the acrylic plate was filled with the resin composition of Example 1. Three sets of such samples were prepared. In two of the samples used, a light-shielding member (black matrix) 5 composed of a 2 mm-width black ink layer was formed on the peripheral area of the acrylic plate. In the remaining one of the samples used, the light-shielding member 5 was not formed.

One sample including the acrylic plate having the light-shielding member 5 formed thereon was irradiated with UV rays (front irradiation) at an integrated light intensity of 5,000 mJ using a UV lamp (product of USHIO Inc.) placed about 10 cm away from the acrylic plate. At the same time, the entire periphery of the frame 6 was irradiated with UV rays (side irradiation) at an integrated light quantity of 5,000 mJ from the outer side surface of the light-shielding member 5 composed of the black ink layer using optical fibers (placed about 3 cm away from the side surfaces of the frame 6).

Only front irradiation was performed on the remaining two samples in the same manner as above without side irradiation.

The acrylic plates were removed from the three image display devices having been irradiated, and the cure ratios of the cured products of the resin compositions were measured at the central portions of the acrylic plates and directly below the light-shielding members 5 as described below. The results are shown in Table 2.

Method for Measuring Cure Ratio of Resin Composition

The curable components (monomer and oligomer) were extracted from each of the non-irradiated resin composition and the cured product of the irradiated resin composition with acetonitrile in an amount giving a concentration of the resin composition or the cured product of 0.2 wt %. The peak intensity $I_0$ of the curable components in the resin composition and the peak intensity $I_1$ of the curable components in the cured product were determined by liquid chromatography, and the cure ratio was computed using the following equation.

Cure ratio(%)=$(I_0-I_1)/I_0 \times 100$.      [Equation 2]

TABLE 2

| Cure ratio of resin composition of Example 1 | | | |
| --- | --- | --- | --- |
|  | Light-shielding member of acrylic plate | Central portion of acrylic plate | Directly below light-shielding member |
| Front irradiation and side irradiation | Presence | 95% | 95% |
| Front irradiation only | Presence | 95% | 50% |
| Front irradiation only | Absence | 95% | 95% |

As can be seen from the results in Table 2, when the light-shielding member was provided in the acrylic plate and only front irradiation was performed, the cure ratio of the resin composition in the central portion of the acrylic plate was high, but the cure ratio of the resin composition directly below the light-shielding member was not high enough. However, when front irradiation was performed together with side irradiation, the cure ratio of the resin composition directly below the light-shielding member was high even when the light-shielding member was formed.

INDUSTRIAL APPLICABILITY

The present invention is useful for manufacturing an image display device such as a liquid crystal display device.

The invention claimed is:

1. A method for manufacturing an image display device, the method comprising the step of forming a cured resin layer by interposing a photo-curable resin composition between a base including an image display unit and a light-transmitting protection member including a light-shielding member and then photo-curing the photo-curable resin composition, wherein a resin composition having a curing shrinkage ratio of 5% or less, yielding a cured product having a storage elastic modulus at 25° C. of $1.0 \times 10^7$ Pa or less, and forming the cured resin layer having a light transmittance of 90% or more in a visible range is used as the photo-curable resin composition, and wherein photo-curing is performed by irradiating the photo-curable resin composition with rays of light through the protection member in a direction perpendicular to a surface of the protection member, and in a direction parallel to the photo-curable resin composition disposed in an area where the light-shielding member is formed.

2. The manufacturing method according to claim 1, wherein the curing shrinkage ratio of the photo-curable resin composition is 1.0 to 3.8% and the cured resin layer has a storage elastic modulus at 25° C. of $1 \times 10^4$ to $4 \times 10^5$ Pa.

3. The manufacturing method according to claim 1, wherein the cured resin layer has a thickness of 50 to 200 μm.

4. The manufacturing method according to claim 1, wherein the photo-curable resin composition contains at least one polymer selected from the group consisting of polyurethane acrylate, polyisoprene acrylate, an esterified product thereof, a hydrogenated terpene resin and a butadiene polymer; at least one acrylate monomer selected from the group consisting of isobornyl acrylate, dicyclopentenyloxyethyl methacrylate and 2-hydroxybutyl methacrylate; and a photo polymerization initiator.

5. The manufacturing method according to claim 1, wherein the image display unit is a liquid crystal display panel.

6. The manufacturing method according to claim 1, wherein the protection member is made of an acrylic resin.

7. The manufacturing method according to claim 1, wherein the protection member is made of an optical glass.

8. The manufacturing method according to claim 1, wherein the photo-curable resin composition disposed in the area where the light-shielding member is formed is irradiated with rays of light through gaps between a plurality of spacers disposed on the base.

9. The manufacturing method according to claim 1, wherein an average surface roughness of a cured product obtained by applying dropwise 2 mg of the photo-curable resin composition to a glass or acrylic plate and irradiating the applied photo-curable resin composition with UV rays is 5.0 nm or less.

* * * * *